United States Patent [19]
De Vré et al.

[11] Patent Number: 5,640,256
[45] Date of Patent: Jun. 17, 1997

[54] DYNAMIC MULTIPLE WAVELENGTH FILTER USING A STRATIFIED VOLUME HOLOGRAPHIC OPTICAL ELEMENT

[75] Inventors: Raymond De Vré, Menlo Park; Lambertus Hesselink, Woodside, both of Calif.

[73] Assignee: Board of Trustees of the Leland Stanfor Junior University, Stanford, Calif.

[21] Appl. No.: 591,011

[22] Filed: Jan. 25, 1996

[51] Int. Cl.[6] .................... G02B 5/32; G02F 1/03
[52] U.S. Cl. .................... 359/3; 359/15; 359/259
[58] Field of Search .................... 359/3, 4, 7, 15, 359/24, 25, 259, 251, 578, 580, 584, 589

[56] References Cited

U.S. PATENT DOCUMENTS

| | | | |
|---|---|---|---|
| 5,071,210 | 12/1991 | Arnold et al. | 359/15 |
| 5,162,297 | 11/1992 | Moss et al. | 359/3 |
| 5,272,550 | 12/1993 | Dickson et al. | 359/15 |
| 5,282,066 | 1/1994 | Yu et al. | 359/3 |
| 5,331,445 | 7/1994 | Dickson et al. | 359/15 |
| 5,449,669 | 9/1995 | Rakuljic et al. | 359/15 |

OTHER PUBLICATIONS

George A. Rakuljic et al, "Volume holographic narrow–band optical filter", Optics Letters, vol. 18, No. 6, Mar. 1993, pp. 459–461.

Gregory P. Nordin et al, "Diffraction properties of stratified volume holographic optical elements", J. Opt. Soc. Am. A, vol. 9, No. 12, Dec. 1992, pp. 2206–2217.

J.J. Stankus et al, "Electric–field–switchable stratified volume holograms in photorefractive polymers", Optics Letters, vol. 19, No. 18, Sep. 1994, pp. 853–855.

Jeffrey P. Wilde et al, "Electric–field–controlled diffraction in photorefractive strontium barium niobate", Optics Letters, vol. 17, No. 12, Jun., 1992, pp. 853–855.

R. V. Johnson et al, "Stratified volume holographic optical elements", Optics Letters, vol. 13, No. 3, Mar. 1988, pp. 459–461.

Muller, R., Alvarez–Bravo, J.V., Arizmendi, L., and Cabrera, J. M.; Tuning of photo–refractive interference filters in LiNbO3; J.Phys. D: Appl. Phys. 27 (1994) 1628–1632.

Primary Examiner—Jon W. Henry

[57] ABSTRACT

A dynamic multiple-wavelength filter which selects at least one wavelength from a beam of radiation incident on a Stratified volume Holographic Optical Element (SVHOE) in accordance with the Bragg condition. The SVHOE has a number n of grating layers i and a hologram of a grating vector $K^i$ is recorded in each grating layer i. A number $n-1$ of buffer layers are interposed between grating layers i such that the layers SVHOE presents an alternating structure of grating and buffer layers. The filter has a diffraction efficiency control, preferably based on the ECD effect, for selectively varying the diffraction efficiency $\eta$ in at least one grating layer i to select from the beam of radiation a narrow bandwidth centered about Bragg wavelength $\lambda_B^i$ of grating layer i.

33 Claims, 9 Drawing Sheets

DYNAMIC MULTIPLE WAVELENGTH FILTER USING A STRATIFIED VOLUME HOLOGRAPHIC OPTICAL ELEMENT

This invention was made with Government support under Grant N00014-92-J-1903 awarded by ARPA. The Government has certain rights in the invention.

BACKGROUND—FIELD OF THE INVENTION

The present invention relates to the field of wavelength filters for selecting wavelengths from an incident beam of radiation, and in particular to a filter which employs a Stratified Volume Holographic Optical Element (SVHOE) with recorded holograms to dynamically filter multiple wavelengths from an incident beam.

BACKGROUND —DESCRIPTION OF PRIOR ART

The ability to filter certain wavelengths from a beam of electromagnetic radiation in the optical and infra-red ranges is important in many applications, for example, in optical communications systems which use radiation in this bandwidth. Ideally, when high resolution is required, filters capable of selecting predetermined wavelengths should have narrow bandwidths around those predetermined wavelengths and select multiple wavelengths simultaneously. In other words, it is desirable for the filters to be dynamic and multiple-wavelength. These prerequisites would render them useful in Wavelength Division Multiplex (WDM) communications systems. Other fields also stand to benefit greatly from such filters.

Conventional multiple-wavelength filters with dynamic adjustment capabilities are very large and have many components, Most are either dynamic or multiple-wavelength, but not both. Consequently, these devices are unsuitable for high-performance applications.

Most recent research results suggest that Stratified Volume Holographic Optical Elements (SVHOE) may be suitable as high-quality wavelength filters. These structures are typically formed in stacks containing multiple holographic layers. Intermediate layers, so-called buffer layers, are present in these structures if no substrate layer is provided.

Exemplary methods for producing conventional SVHOEs can be gleaned from U.S. Pat. No. 5,282,066 to Yu et al. and U.S. Pat. No. 5,162,927 to Moss et al. These references focus on appropriate choices of materials, geometries, and fixing methods to produce viable SVHOEs for holographic recording purposes. Yu et al. use photopolymer gels in the holographic (grating) layers and teach how to produce a large bandwidth SVHOE. Moss et al. disclose advantageous processing methods and the use of photographic films as grating layers.

Proper stabilization or fixing methods of grating layers in SVHOEs are discussed by R. Muller et. al in "Tuning of photorefractive interference filters in $LiNbO_3$" published in J. D: Applied Physics. Phys. 27, (1994), pp. 1628–1632 (printed in the U.K.). Muller et al. also discuss final wavelength adjustments of grating layers by thermal and electrical methods. U.S. Pat. No. 5,335,098 to Leyva and Rakuljic provides additional information on fixing holograms in photorefractive crystals to ensure long-term stability and narrow diffraction bandwidths. Broadening and wavelength shifts are also minimized by the techniques taught by Leyva and Rakuljic.

In U.S. Pat. No. 5,440,669 Rakuljic et al. disclose a new method of holographic recording in photorefractive crystals. The inventors further point out that single-element holographic units recorded according to their invention can be used for wavelength selective filters. These filters have the advantage of very narrow bandwidths, typically less than one Angstrom, but are not dynamic and can only select one wavelength. Furthermore, Rakuljic and Leyva in "Volume holographic narrow-band optical filter" published in Optics Letters, Vol. 18, No. 6, Mar. 15, 1993, pp. 459–461 describe how to use a single crystal (one grating) for filtering out a particular wavelength (the H-α line).

A discussion of SVHOEs focusing more on diffraction efficiency can be found in "Stratified volume holographic optical elements" by R. V. Johnson and A. R. Tanguay, Jr. published in Optics Letters, Vol. 13, No. 3, March 1988, pp. 189–191. The authors of this paper concentrate on issues encountered in the propagating recording geometry.

A general analysis of the geometrical parameters of photorefractive crystals and the relationship of these properties to the diffraction characteristics is presented by Gregory P. Nordin et al. in "Diffraction properties of stratified volume holographic optical elements" in Journal of the Optical Society of America A, Vol. 9, No. 12, December 1992, pp. 2206–17. In particular, Nordin et al. study the effect of the number and widths of buffer layers and grating layers on diffraction properties of an SVHOE. They relate these parameters to diffraction efficiency, angular sensitivity, and overlap in +1 and −1 diffraction orders.

The ability to alter the diffraction efficiency of holographic grating layers in an SVHOE is addressed by J. J. Stankus et al. in "Electric-field-switchable stratified volume holograms in photorefractive polymers", Optics Letters, Vol. 19, No. 18, Sep. 15, 1994, pp. 1480–2. Additional information on efficiency control based on the application of electric fields in photorefractive inorganic crystals can be gleaned from the paper entitled "Electric-field-controlled diffraction in photorefractive strontium barium niobate" by Jeffrey P. Wilde and Lambertus Hesselink in Optics Letters, Vol. 17, No. 12, Jun. 15, 1992, pp. 853–855.

The above references discuss many aspects of SVHOEs. They suggest potential suitability of these structures for wavelength filtering, however, they do not indicate or even suggest how to design a practical, dynamic, multiple-wavelength filter.

In particular, prior art does not teach how to make a multiple-wavelength filter. The proper selection of materials and parameters for making such a filter is not addressed. The criteria for filter wavelength selection to achieve efficient filtering and low interference between adjacent filterable wavelengths are not known. Finally, there is no information to suggest how such a multiple-wavelength filter could be designed to operate dynamically.

OBJECTS AND ADVANTAGES OF THE INVENTION

In view of the state of the art, the object of the present invention is to provide a dynamic multiple-wavelength filter capable of filtering many wavelengths from a beam of radiation simultaneously. The selected wavelengths can be dynamically altered and can lie in the visible and infra-red wavelength ranges.

Another object of the invention is to provide a method for choosing the appropriate wavelengths which can be filtered efficiently with minimum interference, cross-talk and other adverse effects.

Yet another object of the invention is to show how to select the proper materials and parameters for constructing the dynamic multiple-wavelength filter according to the invention.

These and other objects and advantages will become more apparent after consideration of the ensuing description and the accompanying drawings.

SUMMARY OF THE INVENTION

The objects and advantages of the invention are secured by a dynamic multiple-wavelength filter which selects at least one wavelength from a beam of radiation incident on a Stratified Volume Holographic Optical Element (SVHOE). The beam of radiation impinges on the SVHOE in accordance with the Bragg condition. The SVHOE has a number n of grating layers, each individual grating layer being designated by the index i such that i=1...n. A hologram of a grating vector $K^i$ is recorded in each grating layer i. According to well-known physical principles, the grating vector $K^i$ defines in each corresponding grating layer i a Bragg wavelength $\lambda_B^i$. With each Bragg wavelength $\lambda_B^i$ is associated a bandwidth inversely proportional to the thickness of layer i.

A number n−1 of buffer layers are interposed between grating layers i such that the SVHOE presents an alternating structure of grating and buffer layers.

Further, the filter has a diffraction efficiency control for selectively varying the diffraction efficiency η in at least one grating layer i. Preferably, the diffraction efficiency control is set up to vary the diffraction efficiency η in each grating layer i from a minimum value, e.g., almost 0%, to a maximum value, e.g., around 100% in an optimized filter.

By varying the diffraction efficiency η of grating layer i the diffraction efficiency control selects from the beam of radiation that portion of light which propagates at the Bragg wavelength $\lambda_B^i$ of grating layer i. In particular, when the diffraction efficiency η of grating layer i is high the portion of light propagating in a very narrow bandwidth centered at Bragg wavelength $\lambda_B^i$ is strongly diffracted in the signal beam issuing from the SVHOE.

Of course, more than one grating layer can be set at a high diffraction efficiency η at a time. In this manner the SVHOE will select those portions of light from the beam of radiation which propagate at the corresponding Bragg wavelengths of those grating layers set at high diffraction efficiencies. The selection process can be performed at any time, rendering the filtering process dynamic.

The grating layers of the filter can be recorded in propagating and counter-propagating geometries. In case of the counter-propagating geometry the preferred diffraction efficiency control are pairs of transparent electrical plates or contacts sandwiching each grating layer. An electric field produced inside the grating layer by the electrical plates and aligned with the grating vector causes variation of the diffraction efficiency η of the layer. In a propagating geometry the preferred diffraction efficiency control are electrodes positioned outside the SVHOE on each side of each grating layer. The applied electric field is also aligned with the grating vector of each grating layer in this embodiment.

According to the invention, the Bragg wavelength of each grating layer is different. In fact, for the counter-propagating geometry the minimum difference between the Bragg wavelengths $\lambda_B^i$ and $\lambda_B^{i+1}$ of two successive grating layers i and i+1 is characterized by the condition:

$$|\lambda_B^{i+1} - \lambda_B^i| \geq \frac{1}{\pi\epsilon}\Delta\lambda_R^i,$$

where $\Delta\lambda_R^i$ is the bandwidth of Bragg wavelength $\lambda_B^i$ and $\Delta$ is a small constraint number. This condition ensures that the interference between Bragg wavelength $\lambda_B^i$ of grating layer i and Bragg wavelength $\lambda_B^{i-1}$ of grating layer i+1 is less than the small constraint number $\Delta$. The condition for the propagating geometry is similar:

$$|\lambda_B^{i+1} - \lambda_B^i| \geq \frac{1}{\pi\epsilon}\Delta\lambda_T^i,$$

where $\lambda_T^i$ is the bandwidth of Bragg wavelength $\lambda_B^i$ and $\Delta$ is a small constraint number. Proper choice of SVHOE parameters, as disclosed in the specification, will ensure sufficiently high resolution, as well as very low interference and cross-talk between adjacent wavelengths.

The grating layers of the invention are made of photorefractive polymers, photorefractive inorganic crystals, or other index-controllable media. In the counter-propagating geometry the index of refraction of the transparent electric contacts and the index of refraction of the grating layers are closely matched to avoid multiple reflections. In both geometries the indices of refraction of the buffer layers and the grating are preferably matched for the same reason.

The invention is presented in detail in the following detailed description and further elucidated by the drawing figures referenced therein.

BRIEF DESCRIPTION OF THE DRAWINGS

FIG. 10 A,B,C,D are graphs of Bragg selectivity (wavelength) responses as a function of wavelength for a two-layer system illustrating the interference when the two Bragg wavelengths differ by small increments.

DESCRIPTION

The present invention relates to a Stratified Volume Holographic Optical Element (SVHOE) specially designed to operate as a dynamic, multiple-wavelength filter. There are two types of geometrical arrangements which permit the SVHOE to function as a filter according to the invention. In the counter-propagating arrangement the reference beam and the signal beam used to record the holograms used by the SVHOE arrive from opposite directions and impinge on opposite faces of the grating layers. Once the holograms are recorded the SVHOE will filter out the predetermined wavelengths from a reference beam. In the second arrangement-propagating geometry-the reference and signal beams used to inscribe the grating layers of the SVHOE arrive from two different but not opposite directions. The beams impinge on the same face of the SVHOE. Once the holograms are recorded the SVHOE will filter out the predetermined wavelengths from a reference beam, just like in the counter-propagating geometry. For purposes of clarity, the preferred embodiments of SVHOE filters adapted to the counter-propagating and propagating geometries will be discussed separately.

PREFERRED EMBODIMENT IN THE COUNTER-PROPAGATING GEOMETRY

Figure 1:
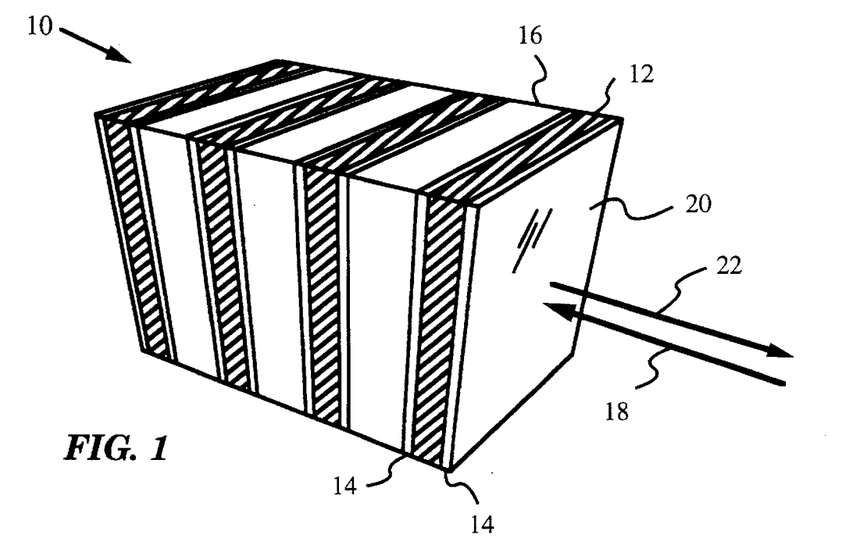
FIG. 1 is a perspective view of an SVHOE according to the invention for use as a filter in the counter-propagating geometry.

FIG. 1 illustrates a SVHOE 10 set up in the counter-propagating geometry. A beam of radiation 18 is shown impinging on face 20 of SVHOE 10. A corresponding signal or response beam 22 issues from same face 20. SVHOE 10 has four active or grating layers 12 sandwiched by electrical plates or contacts 14. Three buffer layers 16 are interposed between successive grating layers 12 sandwiched by contacts 14. The total number of grating layers 12 determines the number of wavelengths which can be dynamically filtered. Grating layers 12 are made of a photorefractive material, in particular a photorefractive inorganic crystal, a photorefractive polymer, or an index-controllable medium. Example inorganic crystals include $LiNbO_3$, SBN, BSO, $BaTiO_3$. Photorefractive polymers are well-known in the art.

Electrical contacts 14 are made of an electrically conductive material which is transparent to the wavelengths of light contained in beam 18. Typically, beam 18 can include radiation in the optical and infra-red ranges. Consequently, contacts 14 are made of, e.g., ITO.

Buffer layers 16 are also transparent to the light of beam 18. It is most preferable to match the indices of refraction of buffer layers 16, electrical contacts 14 and grating layers 12 to avoid multiple reflections. This can be most easily achieved by making all parts of SVHOE 10 of the same base crystal and applying suitable dopants to produce grating layers 12, electrical contacts 14, and buffer layers 16.

Figure 2:
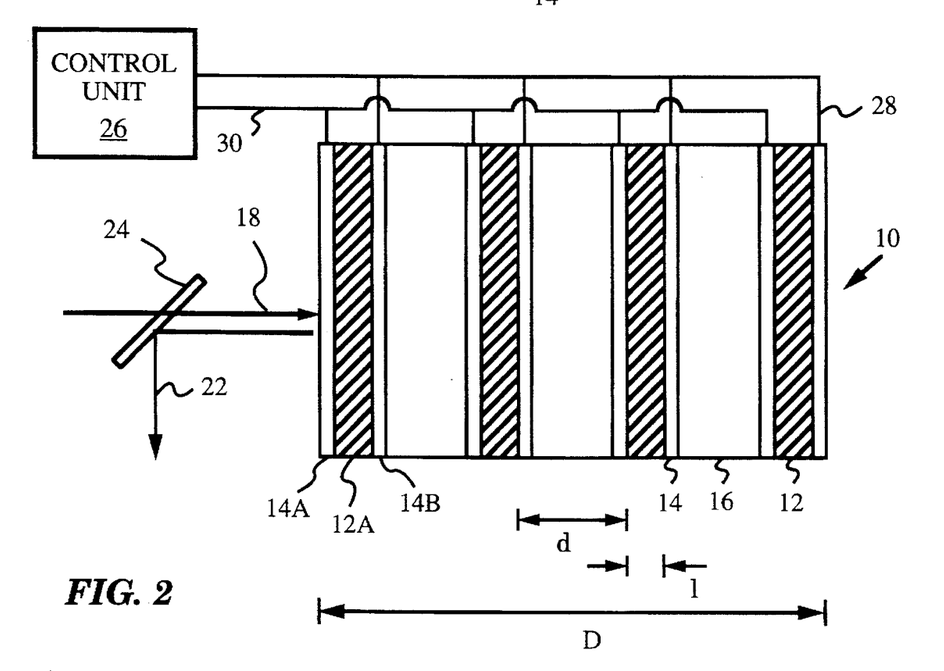
FIG. 2 is a side view of the filter in FIG. 1 illustrating its electrical connections and physical parameters.

To better illustrate the physical parameters of SVHOE 10 we refer to the side view of FIG. 2. Here, the thickness of grating layers 12 is designated by l and the sum thickness of electrical contacts 14 and buffer layer 16 lodged between successive grating layers 12 is designated by d. It should be noted, in accordance with the theory of SVHOEs, that modulation of beam 18 can be considered to occur in grating layers 12 while diffraction of beam 18 takes place in electrical contacts 14 and buffer layers 16. In other words, beam 18 is modulated in successive sections of thickness l and diffracted in sections of thickness d. In practice, the thickness of electrical contacts 14 is much smaller than the thickness of buffer layers 16. In practice, typical thicknesses of contacts 14 range from a few μm to about 1 cm. This means that diffraction is mostly restricted to buffer layers 16. The overall length of SVHOE 10 is designated by D.

As shown in FIG. 2, beam of radiation 18 passes through a beam splitter 24 and impinges on face 20 of SVHOE 10. Response beam 22 exits SVHOE 10 through same face 20 and is reflected at an angle, e.g., 90°, by beam splitter 24. This arrangement is one of the many possible ways in which response beam 22 can be retrieved from SVHOE 10 in a counter-propagating geometry. Beam splitters, e.g., coated mirrors, are well-known to those skilled in the art.

A voltage supply or control unit 26 is connected via leads 28 and 30 to electrical contacts 14. In fact, control unit 26 is designed to selectively apply voltages to pairs of electrical contacts 14, e.g., pair 14A and 14B sandwiching grating layer 12A. Typically, the resulting electrical fields should range from about 10 to 100 kV/cm. The actual value will depend on the photorefractive material. For example, for photorefractive crystals the field will be lower, e.g., on the order of a few kV/cm. Meanwhile, no current should flow through buffer layers 16 or grating layers 12. This can be achieved by rendering these layers dielectric through suitable doping or other techniques known in the art.

For purposes of clarity in the subsequent discussion, it is convenient to number grating layers 12 with ascending numbers using the index i, where i=1. . . n. In the present embodiment there are 4 grating layers 12; thus n=4. Correspondingly, the number of buffer layers 16 is n−1. We shall use the index i when referring to each individual layer of grating layers 12. (In our example designated grating layer 12A is the first layer for which i=1.) Accordingly, grating vector K written in grating layer i will be referred to as grating vector $K^i$.

To prepare SVHOE 10 for operation as a filter, all grating layers i have to be recorded with corresponding holograms of grating vectors $K^i$. There are many methods for doing this. Two different approaches are illustrated in FIGS. 6A–6C.

Figure 6A:
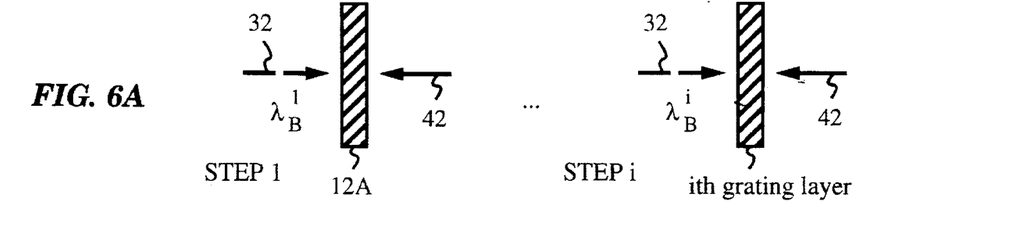
FIG. 6A is a diagram illustrating a method used for recording holograms in individual grating layers to be later assembled into a SVHOE.
Figure 6B:
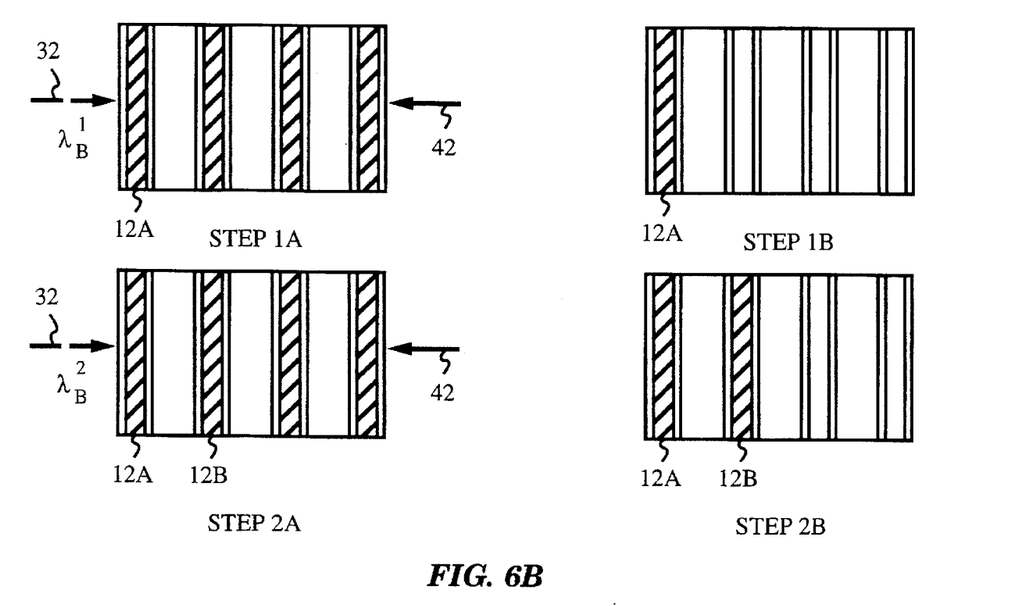
FIG. 6B is a diagram illustrating another method for recording holograms in individual grating layers of an assembled SVHOE.
Figure 6C:
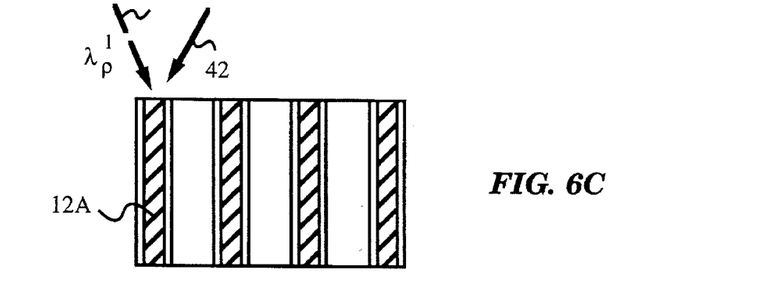
FIG. 6C is a diagram illustrating a method for recording holograms in an SVHOE intended for operation in the IR range.

FIG. 6A shows how to record holograms of grating vectors $K^i$ in grating layers 12 before SVHOE 10 is assembled. In step 1 grating layer 12A is recorded individually. Signal beam 32 and reference beam 42 impinging from opposite directions both contain Bragg wavelength $\lambda_B^i$. Consequently, a hologram of grating vector $K^i$ corresponding to Bragg wavelength $\lambda_B^i$ is written in grating layer 12A. The recording step is repeated for all grating layers 12. Thus, ith grating layer is recorded in step i, and so on until all n grating layers are recorded.

To preserve the recorded holograms each grating layer i has to be fixed. This can be achieved thermally by applying heat to raise the temperature of each grating layer i above a known critical temperature. Alternatively, an electric field exceeding a defined threshold can be used to fix the holograms. Yet another method for fixing is to use the two-photon recording technique. All three fixing techniques-thermal, electrical, and two-photon-are known in the art. Particulars relating to thermal fixing methods can be gleaned form U.S. Pat. No. 5,335,098.

During final assembly the recorded and fixed grating layers i are sandwiched between electrical contacts 14 and buffer layers 16 are placed between the sandwiched sets of layers and contacts. Techniques for producing multi-layered elements of this type are also well-known.

Figure 3:
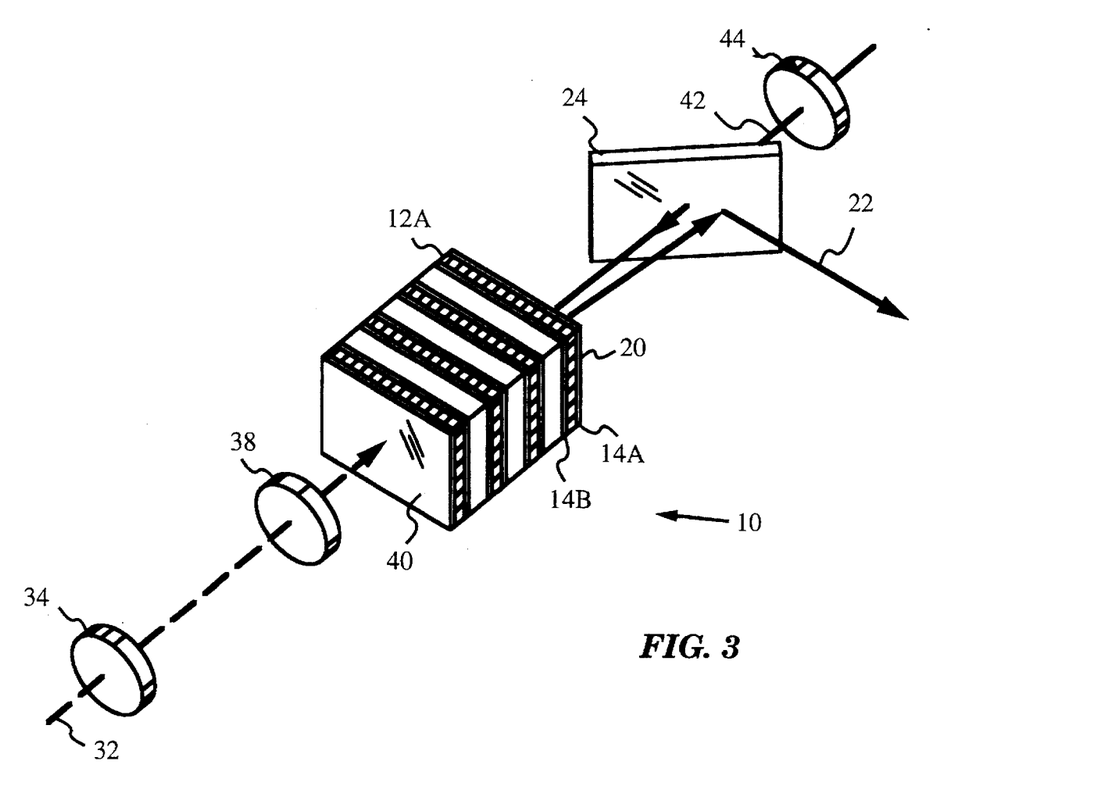
FIG. 3 is an isometric view of a filter according to the invention in the counter-propagating geometry.

A method for recording and fixing SVHOE 10 in the assembled state is shown in FIG. 6B. Here SVHOE 10 is irradiated with two recording beams: a signal beam 32 and a reference beam 42, both containing radiation at Bragg wavelength $\lambda_B^i$, as explained above. Signal beam 32 arrives from the left and is collimated by optics 34, e.g., a collimating lens in the conventional manner (see FIG. 3). Signal beam 32 is then focused by focusing lens 38 on face 40 of SVHOE 10. Reference beam 42 is passed through optics 44, which include collimating and focusing lenses, and beam splitter 24 to face 20. Inside SVHOE 10 the two recording beams, signal beam 32 and reference beam 42, interfere causing holograms of grating vector $K^1$ to be written in all grating layers 12. This is indicated by the hatching in STEP 1A.

After holograms of grating vector $K^1$ corresponding to Bragg wavelength $\lambda_B^1$ are written in all grating layers 12, one of them, here grating layer 12A, is locally fixed using, for example, the thermal or electrical method. Meanwhile, grating layers 12 which were not fixed lose their holograms, as indicated in STEP 1B by the absence of hatching. In step 2A, the hologram of grating vector $K^2$, corresponding to Bragg wavelength $\lambda_B^2$ is recorded in all grating layers 12. In step 2B grating layer 12B is fixed to preserve the hologram of grating vector $K^2$, while remaining grating layers 12 lose their holograms. According to known principles, the hologram of grating vector $K^1$ is preserved in grating layer 12A after this operation. All remaining grating layers 12 are recorded and fixed in the same fashion.

FIG. 6C illustrates a particularly advantageous method of recording SVHOE 10 for operation in the IR range. In certain IR applications the recording material of grating layers 12 is not sensitive enough at the desired wavelengths. Thus, grating layers 12 are recorded by illuminating SVHOE 10 from a direction approximately orthogonal to grating layers 12. In this situation the recording wavelengths, $\lambda_B^i$, of recording beams 32 and 42 used to record the holograms of grating vectors $K^i$ in each grating layer i are shorter than the Bragg wavelengths $\lambda_B^i$. In fact, recording wavelengths $\lambda_r i$ may be several times smaller than the eventual Bragg wavelengths $\lambda_B^i$. The fixing step may then be omitted, since the eventual light beam containing Bragg wavelengths $\lambda_B^i$ to be filtered will not erase grating vectors $K^i$.

Figure 5A:
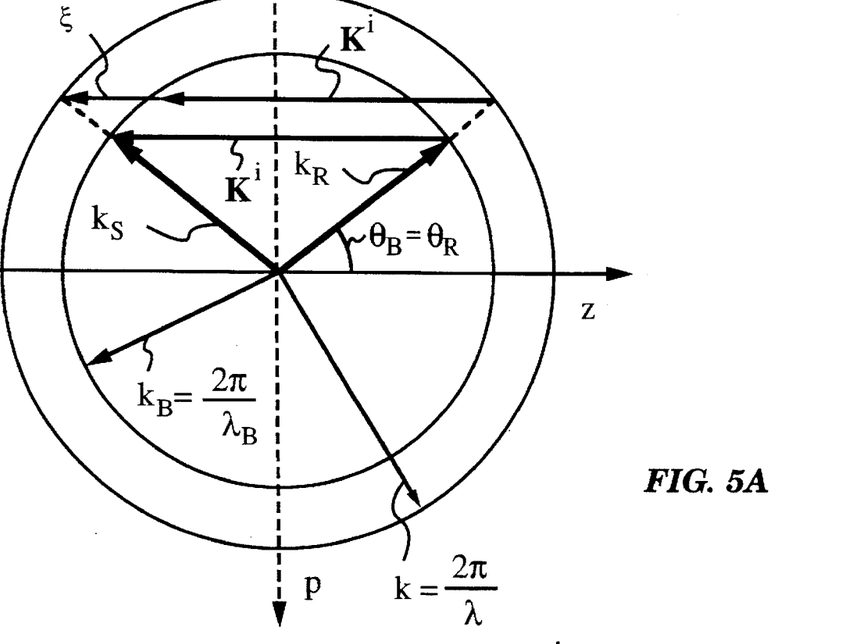
FIG. 5A is a k-space diagram visualizing the Bragg matching condition for the counter-propagating geometry.

The theory of recording holograms of grating vectors $K^i$ will be best understood by reviewing the k-space diagram of FIG. 5A. This figure illustrates a hologram of grating vector $K^i$ written inside, e.g., grating layer 1 (i=1, 12A). For reference, the z axis extends along the direction of propagation of recording beams 32 and 42, while the p axis is perpendicular to their direction of propagation. Signal beam 32 is at the Bragg wavelength $\lambda_B$ and propagates along signal wave vector $k_S$. Reference beam 42 is also propagating in the direction of reference wave vector $k_R$ at Bragg wavelength $\lambda_B$. The absolute value of either wave vector $k_S$ or $k_R$, represented by Bragg radius $k_B$, defines a circle as shown.

Reference wave vector $k_R$ makes an angle $\theta_R$ with the z axis. This angle is equal to the Bragg angle $\theta_B$. According to known physical principles, the interference between signal beam 32 and reference beam 42 causes a hologram of grating vector $K^i$ to be written in grating layer 12A. Grating vector $K^i$ is delimited by wave vectors $k_S^i$ and $k_R^i$, such that:

$$\frac{|k_S^i|}{|k_R^i|} = \frac{2\pi}{\lambda_B^i}$$

Due to the symmetric configuration, the perpendicular component (along the p axis) and the longitudinal component (along the z axis) of grating vector $K^i$ are $K_p=0$ and $K_z=-2 k_B\cos\theta_B=-4\pi (\cos\theta_B/\lambda_B)$, respectively. Therefore, grating vector $K^i$ is essentially aligned with in the direction of propagation of recording beams 32 and 42. In fact, in practical operation $\cos\theta_B$ will usually be nearly or equal to zero.

This arrangement defines the Bragg condition for diffraction. Any future reading beam or reference beam impinging on SVHOE 10 at the Bragg angle $\theta_B$ will have to contain Bragg wavelength $\lambda_B^i$ defined by one of grating layers 12 to be diffracted. Otherwise, Bragg mismatch $\xi$ in wavelength will prevent diffraction. In the preferred embodiment all grating layers are recorded at the same Bragg angle $\theta_B$ so that the angle of incidence of the beam from which the wavelengths are to be filtered can be fixed. In other words, it is preferable to set the condition $\theta_B^i = \theta_B$.

As described above, during the preparatory step holograms corresponding to different grating vectors $K^i$ are written in each grating layer i. The selection of appropriate grating vectors $K^i$ is an important aspect of the invention. In particular, grating vector $K^i$ of each grating layer i should be different such that Bragg wavelength $\lambda_B^i$ of each grating layer i is different. In this manner, each grating layer i is set up to select a different wavelength from a beam of radiation. Preferably, Bragg wavelength $\lambda_B^i$ of grating layer i differs from Bragg wavelength $\lambda_B^{i+1}$ of each successive grating layer i+1 such as to satisfy the condition:

$$|\lambda_B^{i+1} - \lambda_B^i| \geq \frac{1}{\pi\epsilon} \Delta\lambda_R^i.$$

In this inequality $\Delta\lambda_R^i$ is the bandwidth of Bragg wavelength $\lambda_B^i$ and $\Delta$ is a small constraint number. This ensures that the interference between Bragg wavelength $\lambda_B^i$ of grating layer i and Bragg wavelength $\lambda_B^{i+1}$ of grating layer i+1 is less than the small constant number $\epsilon$. This constraint number sets an upper bound on interference cross-talk between adjacent grating layers. The theoretical reasons for this choice will be presented below.

Bandwidth $\Delta\lambda_R^i$ of Bragg wavelength $\lambda_B^i$ is particular to the counter-propagating or reflection geometry; hence it is subscripted by R and calculated according to the following equation:

$$\Delta\lambda_R^i = \frac{(\lambda_B^i)^2}{l_i},$$

where $l_i$ is the thickness of grating layer i.

OPERATION OF THE PREFERRED EMBODIMENT IN THE COUNTER-PROPAGATING GEOMETRY

Figure 7:
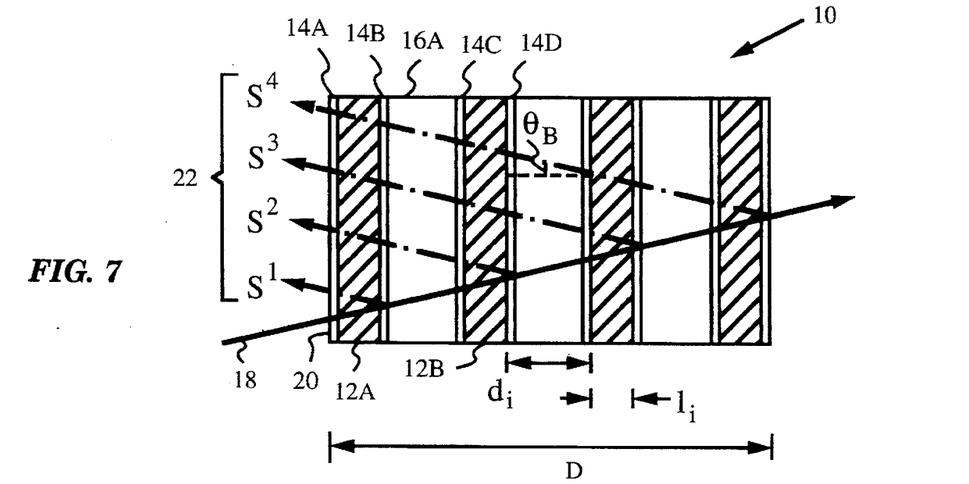
FIG. 7 is a simplified ray diagram for a filter recorded in the counter-propagating geometry.
Figure 8:
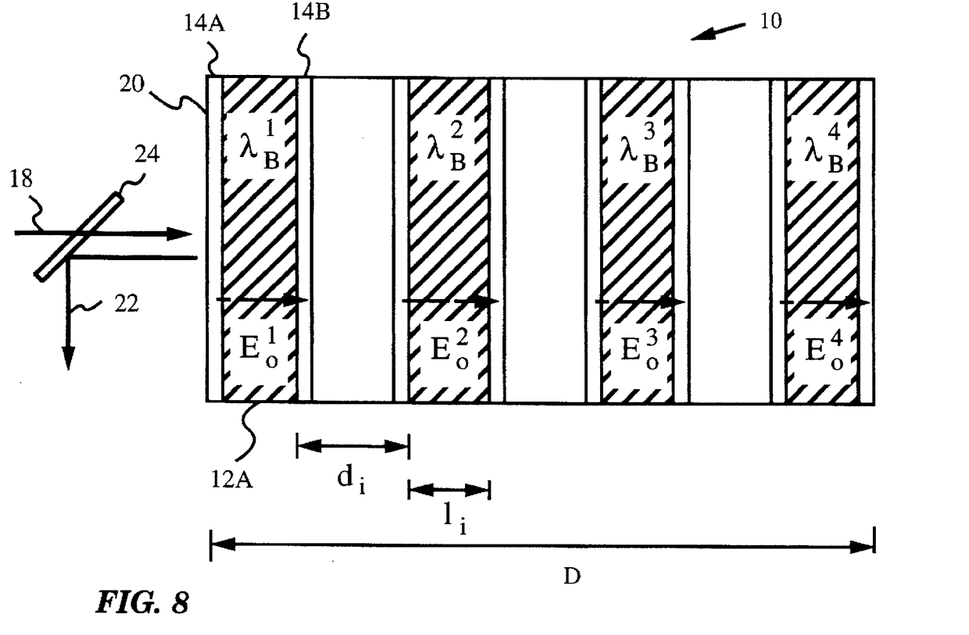
FIG. 8 is a simplified diagram illustrating the application of electric fields to grating layers of a filter recorded in a counter-propagating geometry.

The operation of the preferred embodiment in the counter-propagating geometry will be best understood by initially reviewing simplified FIG. 7 and FIG. 8.

Figure 4:
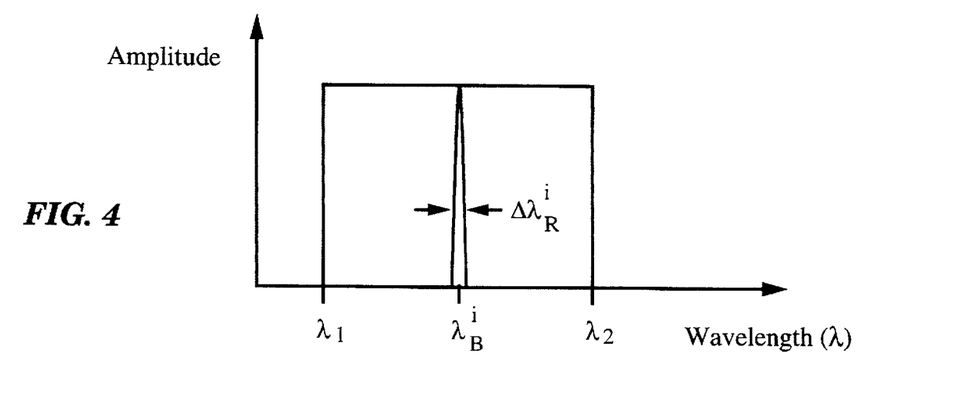
FIG. 4 is a simplified graph of the filtered wavelength of grating layer i of the filter of FIG. 3.

FIG. 7 illustrates SVHOE 10 after holograms of corresponding grating vectors $K^i$ have been recorded and fixed in each grating layer i. Beam of radiation 18, which is to be filtered, passes optics 44 and beam splitter 24 (see FIG. 3), to then impinge on face 20 of SVHOE 10. The spectrum of wavelengths contained in beam 18 is broad covering wavelengths from $\lambda_1$ to $\lambda_2$, e.g., white light, as illustrated in FIG. 4. In other cases, $\lambda_1$ can correspond to a short infra-red wavelength and $\lambda_2$ can be a long infra-red wavelength. Alternatively, $\lambda_1$ and $\lambda_2$ can delimit a chosen bandwidth in the visible wavelength range.

For purposes of illustration, we shall assume that the range of wavelengths between $\lambda_1$ and $\lambda_2$ contains four wavelengths to be filtered from beam 18. Indeed, these particular wavelengths are equal to Bragg wavelengths $\lambda_B^i$ of successive grating layers i.

Figure 9:
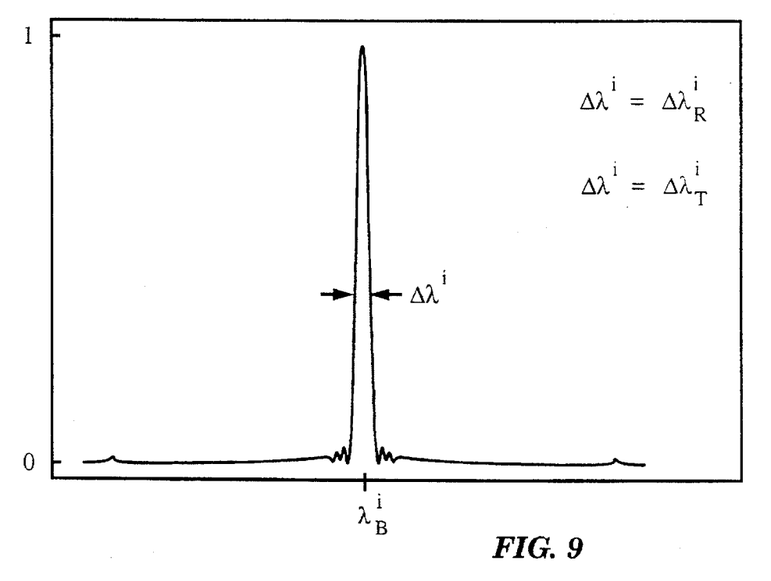
FIG. 9 is a graph of the wavelength selectivity of a single grating layer at maximum diffraction efficiency $\eta_{max}$.
Figure 10A:
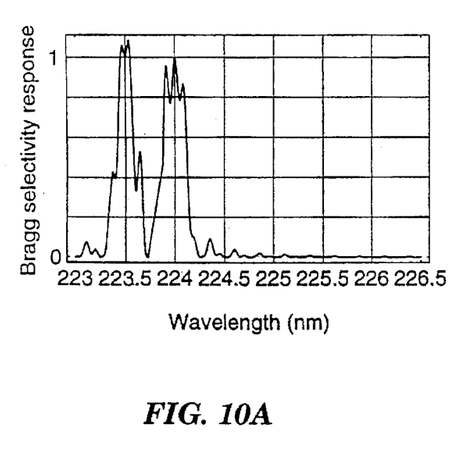
Figure 10B:
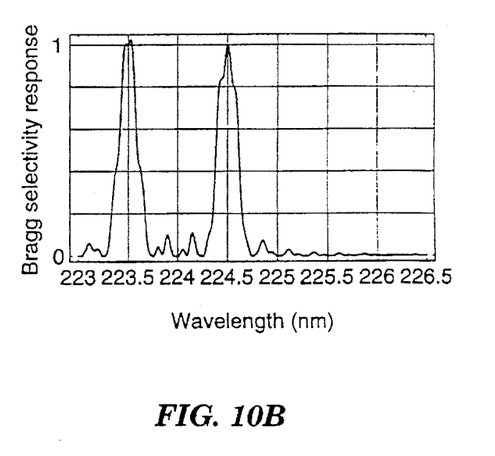
Figure 10C:
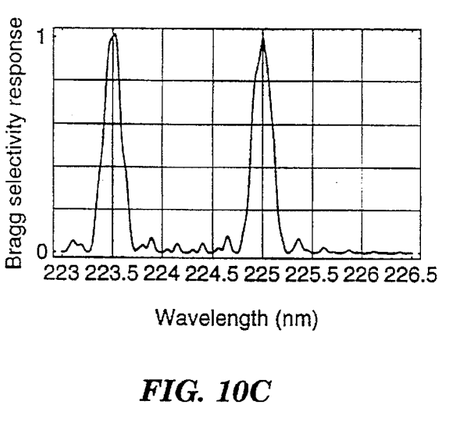
Figure 10D:
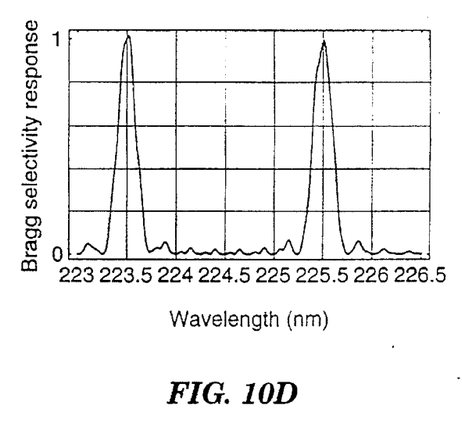

After beam 18 enters SVHOE 10 through face 20, it passes through transparent electrical contact 14A, grating layer 12A, electrical contact 14B, buffer layer 16A, contact 14C, grating layer 12B, contact 14D, etc. The portion of light in beam 18 at Bragg wavelength $\lambda_B^1$ of grating layer 12A is reflected in signal beam $S^1$ at a bandwidth $\Delta\lambda_R^1$ centered around $\lambda_B^1$. This is illustrated in FIG. 9 in a general manner for Bragg wavelength $\lambda_B^i$ of grating layer i. In FIG. 9 bandwidth $\Delta\lambda^i$ is equal to $\Delta\lambda_R^i$ for the counter-propagating geometry. For the propagating geometry discussed below $\Delta\lambda^i = \Delta\lambda_T^i$. Analogously, the light portions of beam 18 at each Bragg wavelength $\lambda_B^i$ are reflected in signal beam $S^i$ by the corresponding grating layer i. Thus, Bragg wavelengths determined by the Bragg condition for each grating layer i, are the wavelengths filtered from beam 18.

The diffraction efficiency $\eta$ of the grating layers of SVHOEs is low. This is because the grating layers are relatively thin. Consequently, the filtering process can be very inefficient. In many situations, the strength of signals $S^i$ teeters on the detection limit. Control unit 26 (see FIG. 2) is used to increase the signal strength by selectively applying voltages to pairs of electrodes 14, e.g., 14A and 14B. The physical principles of this enhancement, called the electrically controlled diffraction (ECD) effect, are elucidated by J. P. Wilde in his PhD thesis entitled "Growth and characterization of strontium barium niobate crystals for multiplex photorefractive holography", Stanford University (1992), hereby incorporated by reference.

The ECD control will be best understood by examining FIG. 8. The ECD is an effect found in photorefractive crystals, e.g., SBN, operating near the ferroelectric-paraelectric phase transition. In the vicinity of this transition, the electro-optic coefficient and the dielectric constant are strongly dependent on the applied field. As shown by J. P. Wilde in his thesis, this combined field dependence allows to increase the diffraction efficiency $\eta$ by applying a controlled electric field. In fact, through this effect, diffraction efficiency $\eta$ of a grating layer i can be enhanced from almost 0% in the absence of the field to 70% or even close to 100% in the presence of a field of a few kV/cm.

Thus, to activate grating layer 1, field $E_o^1$ is applied by the pair of electrical contacts 14A and 14B across grating layer 1. The actual voltage applied to electrical contacts 14A and 14B depends on the thickness l of grating layers 12. For l=1 mm the voltage should be about 1,000 Volts and for l=100 µm the voltage should be around 100 Volts. Such voltages are sufficient to ensure that the magnitude of field $E_o^1$ is in the range of several kV/cm, and thus actively increases the diffraction efficiency $\eta$ to a maximum diffraction efficiency $\eta_{max}$. This can be expressed by the increase in grating amplitude $v_i$ as follows: $v_1 = v_1(E_o^1)$, where $v_1$ is the grating strength of grating layer 1. It is important that the direction of electric field $E_o^1$ be aligned with the direction of grating vector $K^1$. This ensures that the strongest ECD effect.

The maximum value obtainable can be experimentally determined. To select any other Bragg wavelength $\lambda_B^i$ from beam 18, the diffraction efficiency of the corresponding grating layer i is increased to its maximum value $\eta_{max}$ (or a sufficiently large value) by the application of corresponding electric field $E_o^i$. Alternatively, applying no electric field ($E_o^i = 0$) will prevent enhancement of diffraction efficiency $\eta$ effectively lowering it to a minimum value $\eta_{min}$. This means that the electric fields can be used to selectively turn grating layers 12 on and off.

Since electrical contacts 14 can be used to generate electric field $E_o^i$ in grating layer i at any point in time, SVHOE 10 is in fact a dynamic filter. Additionally, the filter is a multiple-wavelength device, since any number of grating layers 12 can be active simultaneously. In other words, the filter of the invention is a device that can be electrically switched to filter one or several wavelengths at a time from a broad-band input signal, i.e., beam 18.

Due to the nature of a SVHOE, there is interference between grating layers i.

The applicants have determined that this interference decreases with an increase in separation between Bragg wavelengths $\lambda_B^i$. This introduces a minimum separation between two wavelengths $\lambda_B^i$ in the dynamic multiple-wavelength filter according to the invention. The minimum separation sets an upper bound on the maximum allowed interference cross-talk. In fact, the applicants have calculated that the separation between Bragg wavelength $\lambda_B^i$ of grating layer i and Bragg wavelength $\lambda_B^{i-1}$ of a successive grating layer i+1 must satisfy the condition:

$$|\lambda_B^{i+1} - \lambda_B^i| \geq \frac{1}{\pi\epsilon} \Delta\lambda_R^i.$$

FIG. 9 shows a graph of the wavelength selectivity of one single grating layer 12 in detail. FIGS. 10A through 10D show the Bragg selectivity responses as a function of wavelength of a two-layer system (not shown) if the separation between the two recording beams, 32 and 42, is given by:

$$\lambda_B^2 - \lambda_B^1 = j\Delta\lambda_R^1,$$

where:

j=1,2,3,4, and $\lambda_B^1 = 223.5$ nm (corresponding to 514 nm outside SVHOE 10 with an index of refraction n=2.3, d=100 µm, $l_1 = l_2 = 100$ µm). The successive figures clearly show the strong interference present in the wavelength selectivity response when two Bragg wavelengths, $\lambda_B^i$ and $\lambda_B^{i+1}$, are only a few bandwidths $\Delta\lambda_R^i$ apart. Thus, for proper operation of filter 10, Bragg wavelengths $\lambda_B^i$ and $\lambda_B^{i+1}$ are separated such that cross-talk between grating layers i and i+1 is negligible, i.e., constraint number $\epsilon$ is subject to the condition: $\epsilon \ll 1$.

When the above condition is fulfilled, the interference terms between grating layers 12 can be neglected and the diffraction efficiency of filter 10 reduces to the sum:

$$\eta = \sum_{j=1}^{N} v_j \left( \frac{\sin^2\xi}{\xi} \right)^2$$

(Note: index j has been used in the summation in this equation to avoid confusion with the imaginary number i). This shows that the diffraction efficiency around each Bragg wavelength $\lambda_B^i$ varies as $[(v_i)(E_o^i)]^2$.

Typical requirements for WDM are channel bandwidths of about 1 nm separated by a few nm. This is achieved by constructing a SVHOE filter according to the invention with grating layers of thickness $l_i = l = 50$ μm (for operation near $\lambda_{Bo} = 514$ nm, where $\lambda_{Bo}$ is the wavelength of recording beams 32 and 42 outside SVHOE 10). Several of these layers can be staked together to form the multiple wavelength filter with the desired performance.

Figures 11, 12:
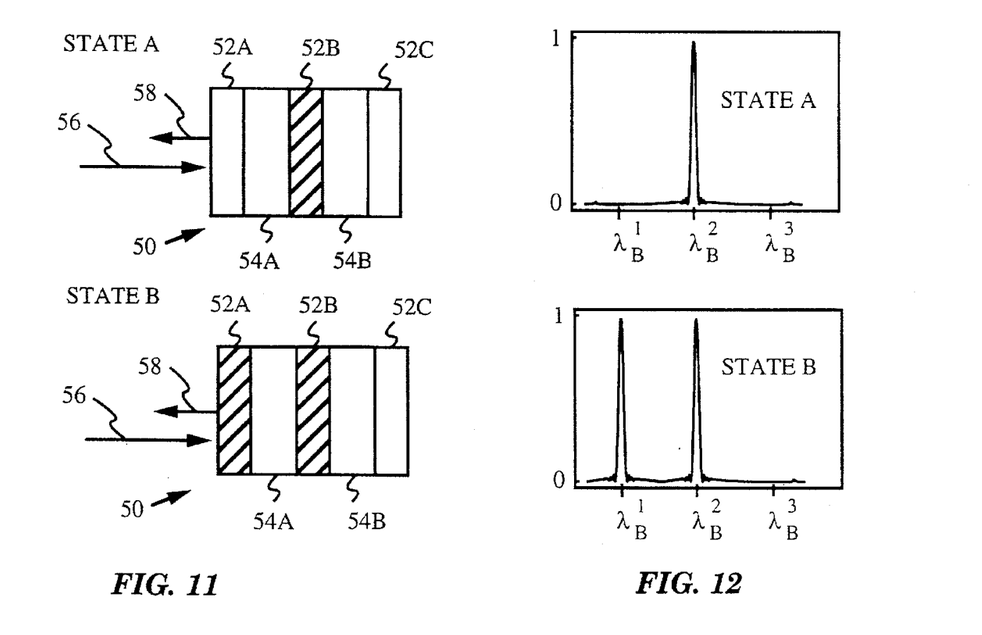
FIG. 11 is a simplified filter according to the invention.
FIG. 12 is a simplified graph showing the wavelength filtering of the simplified filter of FIG. 11.

FIG. 11 shows a simplified SVHOE filter 50 according to the invention in two exemplary operating states. Filter 50 has two buffer layers 54A and 54B, and three grating layers 52A, 52B, and 52C. The hatched grating layers are activated (turned on) by the ECD effect using electric contacts (not shown in this figure). FIG. 12 illustrates the normalized output spectral distribution of filter 50 assuming that beam of radiation 56 incident on filter 50 contains a broadband spectrum which includes wavelengths $\lambda_1, \lambda_2, \lambda_3$ corresponding to Bragg wavelengths $\lambda_B^1, \lambda_B^2, \lambda_B^3$ of grating layers 52A, 52B, and 52C respectively. The filtered wavelengths are contained in signal beam 58. It is further assumed that fields $E_o^1$, $E_o^2$, and $E_o^3$ applied to grating layers 52A, 52B, and 52C increase the grating amplitudes $\upsilon_1, \upsilon_2, \upsilon_3$ of the corresponding grating layer by a factor of 10, i.e., $\upsilon_i(E_o^i) = 10\upsilon_i(0)$.

It should be noted that when an electric field is applied to a photorefractive material, it also induces a change in the Bragg condition. This is due to the electro-optic effect and the piezoelectric effect. Consequently, a shift is observed between the wavelength used to write the grating, $\lambda_B^i$, and the wavelength which will actually be reflected from grating layer i. The theory describing this shift is clarified by R. Müller et al. in "Tuning of photorefractive interference filters LiNbO$_3$" published in J. Phys. D: Applied Physics, Vol. 27, 1994, pp. 1628–32, which is hereby incorporated by reference. In particular, the shift is given by:

$$\frac{\Delta\lambda_B^{i(det)}}{\lambda_B^i} = \left(-\frac{n^2}{2} r_{13}E_o^i + d_{33}E_o^i\right),$$

where $r_{13}$ is the electro-optic coefficient, $d_{33}$ is the piezoelectric coefficient, and $E_o^i$ is the electric field applied to grating layer i during the filtering process. In this equation it is assumed that electric field $E_o^i$ is applied along the c axis of the photorefractive material. Since for a given applied field the detuning of the Bragg condition is constant, it can be compensated for during writing in order to get the desired central filtering wavelength. Suitable compensation methods include proper design and use of a tunable laser as the writing source.

PREFERRED EMBODIMENT IN THE PROPAGATING GEOMETRY

Figure 13:
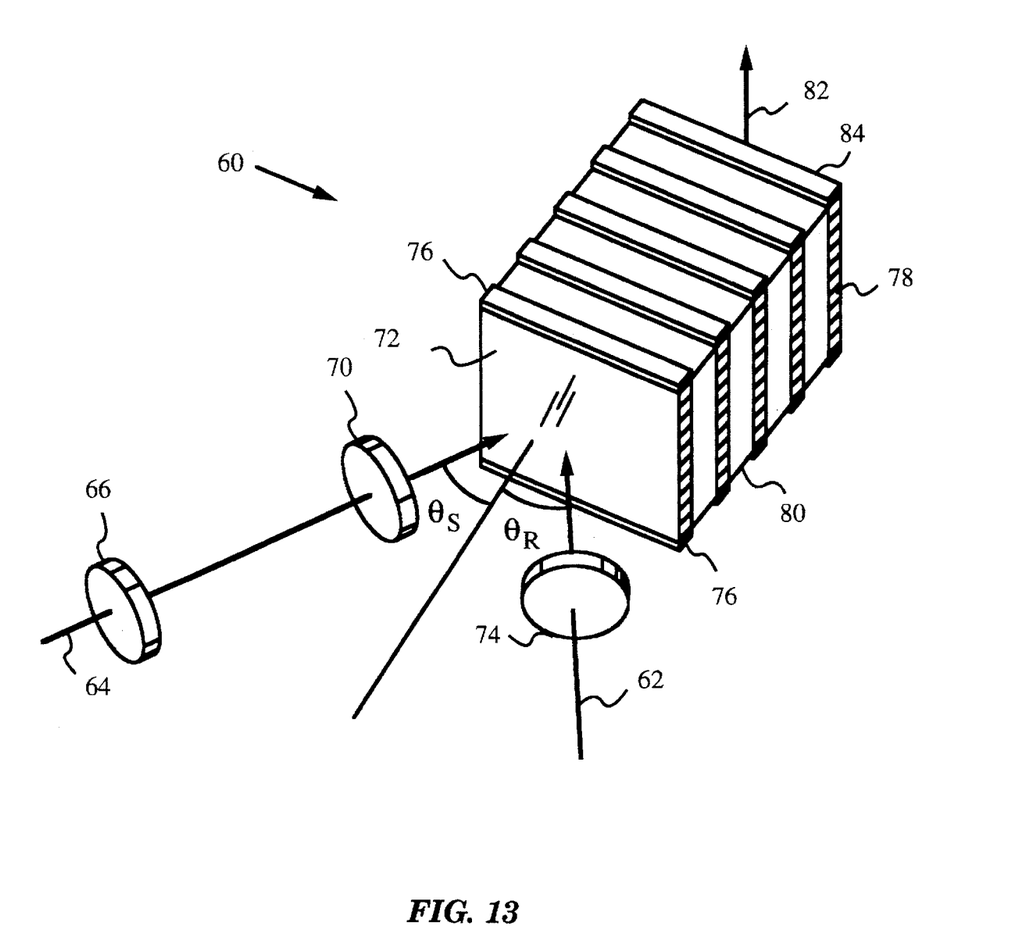
FIG. 13 is an isometric view of a filter according to the invention arranged in the propagating geometry.

The filter according to the invention can also be recorded and operated in the propagating geometry. FIG. 13 shows the arrangement for using SVHOE 60 as a filter in the propagating geometry. SVHOE 60 is prepared or pre-recorded with holograms of grating vectors $K^i$ in the same manner as described for the counter-propagating arrangement. The only difference is the geometry.

Recording SVHOE 60 requires two recording beams: reference beam 62 and signal beam 64. As in the counter-propagating geometry, optics 66 collimate signal beam 64. Focusing lens 70 directs signal beam at face 72 of SVHOE 60. At the same time, reference beam 62 is focused on face 72 by lens 74. Recording beams 62 and 64 impinge on face 72 at an angle equal to $\theta_R + \theta_S$ (where $\theta_R = \theta_S$) with respect to each other. The output or signal beam 82 issues from face 84 on the other side of SVHOE 60. Buffer layers 80 are interposed between successive grating layers. Each grating layer 78 is recorded and fixed in two steps as described above.

All the essential aspects of this embodiment are analogous to the previous one, with the following exceptions. SVHOE 60 has electric contacts 76 positioned outside. In fact, contacts 76 are preferably strips positioned on the top and bottom of each grating layer 78. In this way, the electric fields $E_o^i$ can be applied along the height of each grating layer i, as illustrated in the side view of FIG. 14. In addition, since electric contacts 76 are no longer in the beam path, they do not need to be transparent to the light used.

Figure 5B:
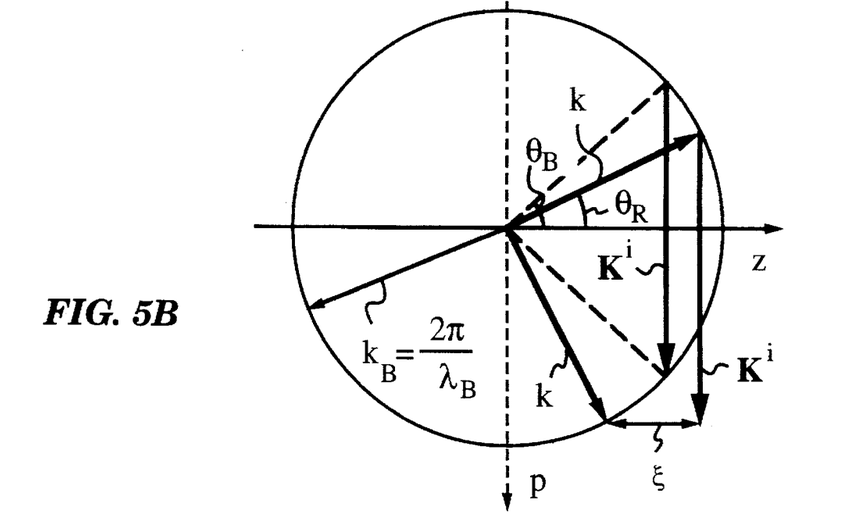
FIG. 5B is a k-space diagram visualizing the Bragg matching condition for the propagating geometry.

Once again, holograms of grating vectors $K^i$ are written in each corresponding grating layer i. In this geometry, however, the Bragg condition is different, as depicted in FIG. 5B. Grating vector $K^i$ has a perpendicular component $K_p = -2k_B\sin\theta_B = -4\pi(\sin\theta_B/\lambda_B)$ while $K_z = 0$. Consequently, grating vector $K^i$ is essentially aligned with the perpendicular direction (along the p axis). Thus, contacts 76 are mounted to apply the electric field along the p direction to utilize the ECD effect for wavelength selection.

FIG. 5B shows what happens when a wave vector k does not pass through grating layer i at Bragg angle $\theta_B$ but angle $\theta_R$ instead. As before, the resulting mismatch, Bragg mismatch $\xi$, is indicated by a vector. In the filter of the invention it is assumed that the angle of incidence of beam of radiation 90 to be filtered will not be varied and will match Bragg angle $\theta_B$. Consequently, as in the counter-propagating case, Bragg mismatch $\xi$ occurs when beam 90 does not contain Bragg wavelength $\lambda_B^i$.

The operation of the preferred embodiment in the propagating geometry is analogous to the operation of the preferred embodiment in the counter-propagating geometry. It is best illustrated by FIG. 14 and FIG. 15.

Figure 14:
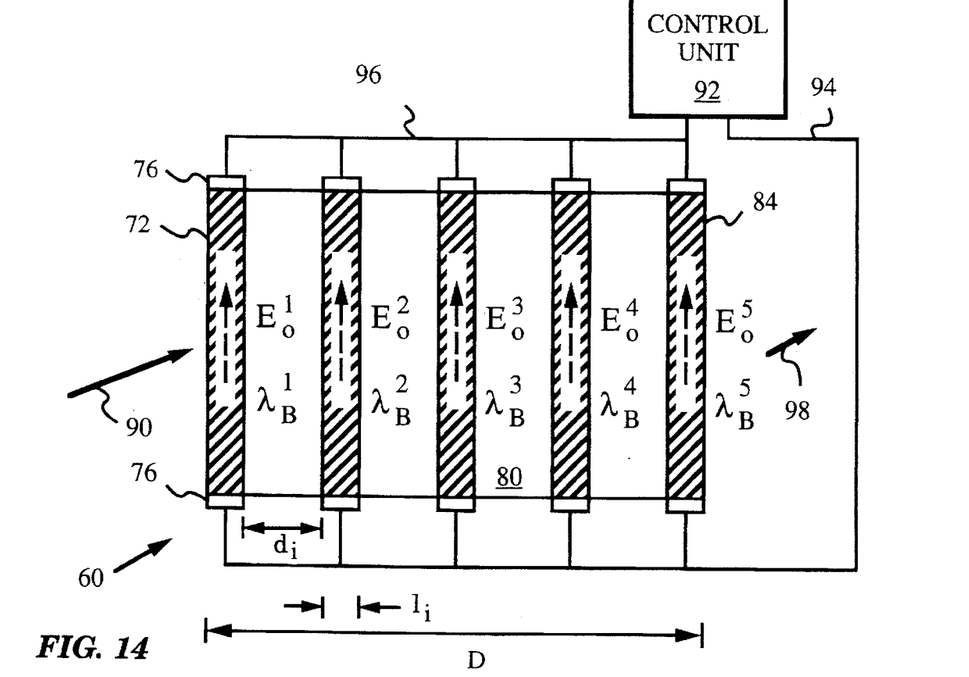
FIG. 14 is a side view of the filter of FIG. 11 illustrating the electrical fields and SVHOE parameters.
Figure 15:
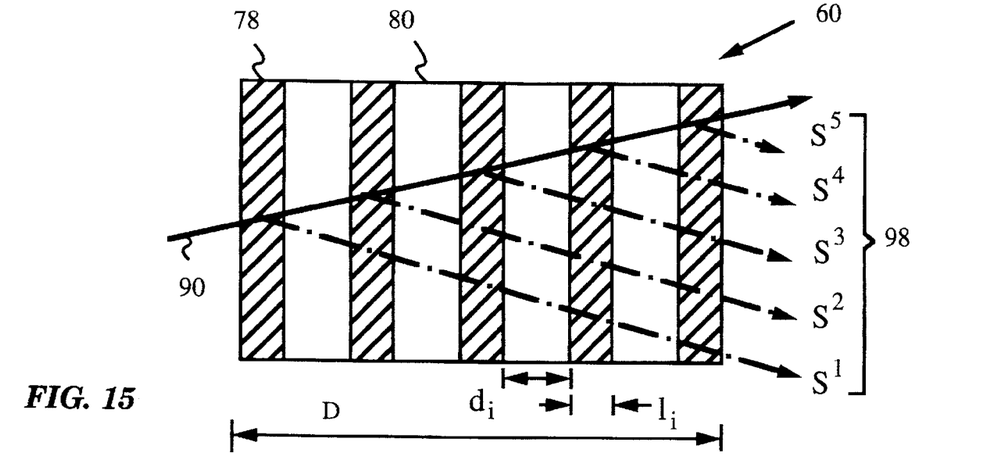
FIG. 15 is a simplified ray diagram for a filter recorded in the propagating geometry.

In FIG. 14 a control unit 92 applies voltages via leads 94 and 96 to pairs of electric contacts 76 to turn the corresponding grating layers 78 on and off. As shown, the electric fields $E_o^i$ are aligned along the perpendicular direction. The output or signal beam 98 transmitted through SVHOE 60 issues from face 84. This beam contains Bragg wavelengths $\lambda_B^i$ with bandwidths $\Delta\lambda_T^i$ of grating layers i which are turned on during the filtering process.

The applicants have determined that the interference between successive grating layers i and i+1 in the propagating geometry is governed by the same condition as in the counter-propagating geometry:

$$|\lambda_B^{i+1} - \lambda_B^i| \geq \frac{1}{\pi\epsilon} \Delta\lambda_T^i.$$

In this case, however, the bandwidth $\Delta\lambda_T^i$ is not the same as the bandwidth $\Delta\lambda_R^i$. Instead, if one assumes that $\theta_R = \theta_S = \theta$, bandwidth $\Delta\lambda_T^i$ is determined from the relation:

$$\Delta\lambda_R^i = \frac{\cos\theta}{\sin^2\theta} \frac{\lambda^2}{l}.$$

As a result, $\Delta\lambda_T^i$ tends to be larger than $\Delta\lambda_R^i$. This means that the wavelength resolution or selectivity in the counter-propagating geometry is better than in the propagating geometry. Consequently, depending on the resolution required and materials available for any given application, a person skilled in the art will select either the propagating or counter-propagating geometry.

SUMMARY, RAMIFICATIONS, AND SCOPE

The presented filter has many applications and its design will thus vary depending on the application. In particular, the bandwidth of the filtered wavelengths may need to be adjusted depending on the field of use. Also, many alterations in the design or arrangement of the filter can be introduced without going beyond the scope of the invention.

Notably, the heaters required during the thermal fixing step may be integrated with the filter to facilitate reprogramming of Bragg wavelengths at any time. This would be particularly useful when it is known ahead of time that the filtered wavelengths will change. Also, anti-reflective coatings can be applied on the faces of the SVHOE to prevent reflective losses.

Finally, the diffraction control does not need to be based on the ECD effect. Thermal or other methods known to those skilled in the art can be used to alter diffraction efficiencies $\eta_i$ of grating layers. Suitable elements to impart these changes in diffraction efficiency $\eta$ will be incorporated into the SVHOE.

Therefore, the scope of the invention should be determined, not by examples given, but by the appended claims and their legal equivalents.

We claim:

1. A dynamic multiple-wavelength filter for selecting at least one predetermined wavelength from a beam of radiation incident on a stratified volume holographic optical element (SVHOE) in accordance with the Bragg condition, said dynamic multiple-wavelength filter comprising:

a) a number n of grating layers, said number n being at least 2, and each grating layer i, where i=1...n, having a corresponding recorded hologram of a grating vector $K^i$, each grating vector $K^i$ determining a Bragg wavelength $\lambda_B^i$ in grating layer i, and each grating layer i inducing modulation in said beam of radiation;

b) a number n−1 of buffer layers interposed between said grating layers; and c) diffraction efficiency control means for selectively varying the diffraction efficiency $\eta$ of at least one grating layer i, thereby dynamically selecting from said beam of radiation the portion of light propagating at Bragg wavelength $\lambda_B^i$, Bragg wavelength $\lambda_B^i$ being said at least one predetermined wavelength.

2. The dynamic multiple-wavelength filter of claim 1, wherein grating vector $K^i$ of grating layer i is recorded in a counter-propagating geometry, such that grating vector $K^i$ is substantially aligned in the direction of the recording beams.

3. The dynamic multiple-wavelength filter of claim 2, wherein grating vector $K^i$ of each grating layer i is selected such that Bragg wavelength $\lambda_B^i$ of each grating layer i is different.

4. The dynamic multiple-wavelength filter of claim 2, wherein Bragg wavelength $\lambda_B^i$ of grating layer i differs from Bragg wavelength $\lambda_B^{i+1}$ of successive grating layer i+1 such as to satisfy the condition $$|\lambda_B^{i+1} - \lambda_B^i| \geq \frac{1}{\pi \epsilon} \Delta\lambda_R^i,$$

where $\Delta\lambda_R^i$ is the bandwidth of Bragg wavelength $\lambda_B^i$ and $\epsilon$ is a constraint number such that $\epsilon \ll 1$, thereby ensuring that the interference between Bragg wavelength $\lambda_B^i$ of grating layer i and Bragg wavelength $\lambda_B^{i+1}$ of grating layer i+1 is less than said constraint number $\epsilon$.

5. The dynamic multiple-wavelength filter of claim 1, wherein the index of refraction of said grating layers and the index of refraction of said buffer layers are matched.

6. The dynamic multiple-wavelength filter of claim 1, wherein said diffraction efficiency control means are pairs of electrical contacts which are transparent to said beam of radiation, said pairs of electrical contacts sandwiching each grating layer i and producing upon activation an electric field inside each grating layer i substantially aligned with grating vector $K^i$.

7. The dynamic multiple-wavelength filter of claim 6, further including a voltage supply means for selectively activating said pairs of electrical contacts.

8. The dynamic multiple-wavelength filter of claim 6, wherein the magnitude of said electric field inside grating layer i is adjusted to obtain maximum diffraction efficiency $\eta_{max}$ at Bragg wavelength $\lambda_B^i$ of grating layer i.

9. The dynamic multiple-wavelength filter of claim 6, wherein the index of refraction of said grating layers and the index of refraction of said pairs of electrical contacts are matched.

10. The dynamic multiple-wavelength filter of claim 1, wherein Bragg wavelength $\lambda_B^i$ of grating layer i differs from Bragg wavelength $\lambda_B^{i+1}$ of successive grating layer i+1 such as to satisfy the condition $$|\lambda_B^{i+1} - \lambda_B^i| \geq \frac{1}{\pi \epsilon} \Delta\lambda_R^i,$$

where $\Delta\lambda_R^i$ is the bandwidth of Bragg wavelength $\lambda_B^i$ and $\epsilon$ is a constraint number such that $\epsilon \ll 1$, thereby ensuring that the interference between Bragg wavelength $\lambda_B^i$ of grating layer i and Bragg wavelength $\lambda_B^{i+1}$ of grating layer i+1 is less than said constraint number $\epsilon$.

11. The dynamic multiple-wavelength filter of claim 1, wherein each grating layer i is made of a material selected from the group consisting of photorefractive polymers, photorefractive inorganic crystals, index-controllable media.

12. The dynamic multiple-wavelength filter of claim 1, wherein said at least one predetermined wavelength is selected from a range of wavelengths consisting of visible and infrared wavelengths.

13. The dynamic multiple-wavelength filter of claim 1, wherein grating vector $K^i$ of grating layer i is recorded in a propagating geometry.

14. The dynamic multiple-wavelength filter of claim 13, wherein grating vector $K^i$ of each grating layer i is selected such that Bragg wavelength $\lambda_B^i$ of each grating layer i is different.

15. The dynamic multiple-wavelength filter of claim 13, wherein Bragg wavelength $\lambda_B^i$ of grating layer i differs from Bragg wavelength $\lambda_B^{i+1}$ of successive grating layer i+1 such as to satisfy the condition $$|\lambda_B^{i+1} - \lambda_B^i| \geq \frac{1}{\pi \epsilon} \Delta\lambda_T^i,$$

where $\Delta\lambda_T^i$ is the bandwidth of Bragg wavelength $\lambda_B^i$ and $\epsilon$ is a constraint number such that $\epsilon \ll 1$, thereby ensuring that the interference between Bragg wavelength $\lambda_B^i$ of grating layer i and Bragg wavelength $\lambda_B^{i-1}$ of successive grating layer i+1 is less than said constraint number $\epsilon$.

16. The dynamic multiple-wavelength filter of claim 13, wherein said diffraction efficiency control means are pairs of electrical contacts sandwiching each grating layer i from two sides and producing upon activation an electric field inside each grating layer i substantially aligned with grating vector $K^i$.

17. The dynamic multiple-wavelength filter of claim 16, further including a voltage supply means for selectively activating said pairs of electrical contacts.

18. The dynamic multiple-wavelength filter of claim 16, wherein the magnitude of said electric field inside grating layer i is adjusted to obtain maximum diffraction efficiency $\eta_{max}$ of Bragg wavelength $\lambda_B^i$ of grating layer i.

19. A dynamic multiple-wavelength filter for selecting at least one predetermined wavelength from a beam of radiation incident on a stratified volume holographic optical element (SVHOE) in accordance with the Bragg condition, said dynamic multiple-wavelength filter comprising:
   a) a number n of grating layers, said number n being at least 2, and each grating layer i, where i=1...n, having a corresponding recorded hologram of a grating vector $K^i$, each grating vector $K^i$ determining a Bragg wavelength $\lambda_B^i$ of grating layer i, each of said grating layers inducing modulation in said beam of radiation;
   b) a number n−1 of buffer layers interposed between said grating layers; and
   c) diffraction efficiency control means positioned outside said SVHOE for selectively varying the diffraction efficiency $\eta$ of at least one grating layer i, thereby dynamically selecting from said beam of radiation the portion of light propagating at Bragg wavelength $\lambda_B^i$, Bragg wavelength $\lambda_B^i$ being said at least one predetermined wavelength.

20. The dynamic multiple-wavelength filter of claim 19, wherein grating vector $K^i$ of grating layer i is recorded in a propagating geometry.

21. The dynamic multiple-wavelength filter of claim 20, wherein grating vector $K^i$ of each grating layer i is selected such that Bragg wavelength $\lambda_B^i$ of each grating layer i is different.

22. The dynamic multiple-wavelength filter of claim 20, wherein Bragg wavelength $\lambda_B^i$ of grating layer i differs from Bragg wavelength $\lambda_B^{i+1}$ of successive grating layer i+1 such as to satisfy the condition $$|\lambda_B^{i+1} - \lambda_B^i| \geq \frac{1}{\pi\epsilon} \Delta\lambda_T^i,$$

where $\Delta\lambda_T^i$ is the bandwidth of Bragg wavelength $\lambda_B^i$ and $\epsilon$ is a constraint number such that $\epsilon \ll 1$, thereby ensuring that the interference between Bragg wavelength $\lambda_B^i$ of grating layer i and Bragg wavelength $\lambda_B^{i+1}$ of successive grating layer i+1 is less than said constraint number $\epsilon$.

23. The dynamic multiple-wavelength filter of claim 19, wherein the index of refraction of said grating layers and the index of refraction of said buffer layers is matched.

24. The dynamic multiple-wavelength filter of claim 19, wherein said diffraction efficiency control means are pairs of electrical contacts sandwiching each grating layer i from two sides and producing upon activation an electric field inside each grating layer i substantially aligned with grating vector $K^i$.

25. The dynamic multiple-wavelength filter of claim 24, further including a voltage supply means for selectively activating said pairs of electrical contacts.

26. The dynamic multiple-wavelength filter of claim 24, wherein the magnitude of said electric field inside grating layer i is adjusted to obtain maximum diffraction efficiency $\eta_{max}$ of Bragg wavelength $\lambda_B^i$ of grating layer i.

27. The dynamic multiple-wavelength filter of claim 19, wherein each grating layer i is of a material selected from the group consisting of photorefractive polymers, photorefractive inorganic crystals, index-controllable media.

28. The dynamic multiple-wavelength filter of claim 19, wherein said at least one predetermined wavelength is selected from a range of wavelengths consisting of visible and infrared wavelengths.

29. A method for dynamically selecting at least one predetermined wavelength from a beam of radiation incident on a stratified volume holographic optical element (SVHOE) in accordance with the Bragg condition, said SVHOE comprising a number n of grating layers, said number n being at least 2, and each grating layer i, where i=1...n, being made of a photorefractive material, said SVHOE further comprising a number n−1 of buffer layers interposed between said grating layers, said method comprising the steps of:
   a) holographically recording in each grating layer i a corresponding hologram of a grating vector $K^i$ determining a Bragg wavelength $\lambda_B^i$ of grating layer i, each of said grating layers inducing modulation in said beam of radiation;
   b) passing said beam of radiation through said SVHOE;
   c) selectively varying the diffraction efficiency $\eta$ of at least one grating layer i using a diffraction efficiency control means, thereby dynamically selecting from said beam of radiation the portion of light propagating at Bragg wavelength $\lambda_B^i$, Bragg wavelength $\lambda_B^i$ being said at least one predetermined wavelength.

30. The method of claim 29, wherein said grating vector $K^i$ is recorded in said SVHOE in a counter-propagating geometry.

31. The method of claim 29, wherein said grating vector $K^i$ is recorded in said SVHOE in a propagating geometry.

32. The method of claim 29, wherein said grating vector $K^i$ is recorded in said SVHOE with a recording wavelength $\lambda_p^i$ different from Bragg wavelength $\lambda_B^i$.

33. The method of claim 32, wherein said at least one predetermined wavelength is selected from infrared wavelengths.

* * * * *

UNITED STATES PATENT AND TRADEMARK OFFICE
CERTIFICATE OF CORRECTION

PATENT NO. : 5,640,256
DATED : June 17, 1997
INVENTOR(S) : De Vré et al.

It is certified that error appears in the above-indentified patent and that said Letters Patent is hereby corrected as shown below:

On the title page, item [19] change the inventor(s) name "De Vréet al." to read as --De Vré et al.--.

In item [73] change the Assignee to read as --Board of Trustees of the Leland Stanford Junior University--.

Signed and Sealed this

Twenty-fifth Day of November, 1997

Attest:

BRUCE LEHMAN

Attesting Officer

Commissioner of Patents and Trademarks